US012331935B2

(12) United States Patent
Robison et al.

(10) Patent No.: US 12,331,935 B2
(45) Date of Patent: *Jun. 17, 2025

(54) COOKING EXHAUST HOOD VENTILATION SYSTEM

(71) Applicant: ILLINOIS TOOL WORKS INC., Glenview, IL (US)

(72) Inventors: Russell Robison, Yamhill, OR (US); Kui-Chiu Kwok, Gurnee, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 442 days.

This patent is subject to a terminal disclaimer.

(21) Appl. No.: 17/826,952

(22) Filed: May 27, 2022

(65) Prior Publication Data

US 2022/0290871 A1 Sep. 15, 2022

Related U.S. Application Data

(63) Continuation of application No. 16/654,587, filed on Oct. 16, 2019, now Pat. No. 11,371,719, which is a (Continued)

(51) Int. Cl.

*F24C 15/20* (2006.01)
*B03C 3/017* (2006.01)

(Continued)

(52) U.S. Cl.

CPC ............ *F24C 15/205* (2013.01); *B03C 3/017* (2013.01); *B03C 3/08* (2013.01); *B03C 3/12* (2013.01);

(Continued)

(58) Field of Classification Search

CPC ............................... F24C 15/205; B03C 3/017

(Continued)

(56) References Cited

U.S. PATENT DOCUMENTS 1,357,202 A 10/1920 Nesbit
2,654,438 A 10/1953 Wintermute (Continued)

FOREIGN PATENT DOCUMENTS

CN 2156940 2/1994
CN 1188875 7/1998

(Continued)

OTHER PUBLICATIONS

PCT, International Search Report and Written Opinion, International Application No. PCT/US2018/030836; date of mailing Aug. 8, 2018, 12 pages.

(Continued)

*Primary Examiner* — Avinash A Savani

(74) *Attorney, Agent, or Firm* — THOMPSON HINE LLP

(57) ABSTRACT

A commercial cooking equipment exhaust hood system includes a hood structure including an inlet opening to an exhaust flow path through the hood. A filter unit is positioned along the exhaust flow path. An electrostatic precipitator unit is downstream of the filter unit. The electrostatic precipitator includes an ionizing section upstream of a collecting section. The ionizing section includes a plurality of ionizing flow paths having side profile patterns that vary in width between at least one wide section and at least one narrow section. The collecting section includes a plurality of collecting flow paths with side profile patterns of substantially uniform width and a repeating undulating side profile pattern. A UV light source may also be provided within the hood, with a controller operatively connected to control the UV light source via a dimmer to enable selective production various UV levels.

10 Claims, 8 Drawing Sheets

Related U.S. Application Data continuation of application No. 15/611,192, filed on Jun. 1, 2017, now Pat. No. 10,488,056.

(51) Int. Cl.

| | |
|---|---|
| ***B03C 3/08*** | (2006.01) |
| ***B03C 3/12*** | (2006.01) |
| ***B03C 3/36*** | (2006.01) |
| ***B03C 3/41*** | (2006.01) |
| ***B03C 3/47*** | (2006.01) |

(52) U.S. Cl.

CPC .............. *B03C 3/366* (2013.01); *B03C 3/368* (2013.01); *B03C 3/41* (2013.01); *B03C 3/47* (2013.01); *F24C 15/20* (2013.01); *F24C 15/2035* (2013.01); *F24C 15/2064* (2013.01); *B03C 2201/04* (2013.01); *F24C 15/2057* (2013.01); *F24C 15/2078* (2013.01)

(58) Field of Classification Search

USPC ...................................................... 126/299 D

See application file for complete search history.

(56) References Cited

U.S. PATENT DOCUMENTS

| | | | |
|---|---|---|---|
| 3,040,498 | A | 6/1962 | Berly |
| 3,678,653 | A | 7/1972 | Buschman |
| 3,837,269 | A | 9/1974 | Sweet |
| 4,036,994 | A | 7/1977 | Ear |
| 4,124,359 | A | 11/1978 | Geller |
| 4,796,590 | A | 1/1989 | Degobert |
| 5,292,353 | A | 3/1994 | Kaufman |
| 5,403,383 | A | 4/1995 | Jaisinghani |
| 5,632,806 | A | 5/1997 | Galassi |
| 5,855,653 | A | 1/1999 | Yamamoto |
| 6,149,717 | A | 11/2000 | Satyapal |
| 6,235,090 | B1 | 5/2001 | Bernstein |
| 6,869,468 | B2 | 3/2005 | Gibson |
| 6,878,195 | B2 | 4/2005 | Gibson |
| 8,002,881 | B2 | 8/2011 | Bagwell |
| 8,398,928 | B2 | 3/2013 | Bagwell |
| 8,939,142 | B2 | 1/2015 | Robison |
| 9,119,891 | B2 | 9/2015 | Livchak |
| 2002/0157661 | A1 | 10/2002 | Kornberger |
| 2003/0146082 | A1 | 8/2003 | Gibson |
| 2004/0025690 | A1 * | 2/2004 | Krigmont ................. B03C 3/38 95/78 |
| 2004/0211321 | A1 | 10/2004 | Gibson |
| 2005/0028676 | A1 | 2/2005 | Heckel |
| 2005/0178378 | A1 | 8/2005 | Marshall |
| 2005/0224069 | A1 | 10/2005 | Patil et al. |
| 2008/0110339 | A1 * | 5/2008 | Kwok ................ F24C 15/2035 95/79 |
| 2008/0135041 | A1 | 6/2008 | Robison |
| 2009/0042500 | A1 | 2/2009 | Robison |
| 2010/0089240 | A1 | 4/2010 | Krichtafovitch |
| 2014/0056764 | A1 | 2/2014 | Verner |
| 2015/0297771 | A1 | 10/2015 | Law |
| 2016/0030782 | A1 | 2/2016 | Livchak |

FOREIGN PATENT DOCUMENTS

| | | | |
|---|---|---|---|
| CN | 101099945 | A | 1/2008 |
| CN | 101528322 | A | 9/2009 |
| CN | 100591425 | | 2/2010 |
| CN | 203298403 | U | 11/2013 |
| CN | 203731519 | | 7/2014 |
| CN | 104654391 | | 5/2015 |
| CN | 104964325 | A | 10/2015 |
| CN | 205146446 | U | 4/2016 |
| CN | 106051852 | A | 10/2016 |
| DE | 684342 | | 11/1939 |
| GB | 986410 | A | 3/1965 |
| GB | 2030476 | | 10/1978 |
| GB | 1559629 | | 1/1980 |
| TW | 200808431 | | 2/2008 |
| TW | 200831832 | | 8/2008 |

OTHER PUBLICATIONS

Yao Zhongpeng, “Principle, Design and Application of Air Purification”, China Science and Technology Press, Oct. 1, 2014, pp. 99-114.

* cited by examiner

COOKING EXHAUST HOOD VENTILATION SYSTEM

TECHNICAL FIELD

This application relates generally to exhaust systems utilized in commercial cooking environments such as the cooking areas of restaurant, school, hospitals and other institutions, and, more specifically, to a kitchen exhaust hood ventilation system that incorporates an electrostatic precipitator (ESP) and/or ultraviolet (UV) light treatment.

BACKGROUND

Kitchen ventilator hoods have long been provided for the purpose of exhausting steam, smoke and particulates such as grease which are produced in the commercial kitchen environment. ESP units have been used in kitchen exhaust hoods before. UV light treatment systems have also been used in kitchen exhaust hoods before.

It would be desirable to provide an exhaust hood system with improved performance by way of an improved ESP configuration and/or method of ESP operation and/or by way of an improved UV light treatment system that more effectively deals with odors.

SUMMARY

In one aspect, a commercial cooking equipment exhaust hood system includes a hood structure including an inlet opening to an exhaust flow path through the hood. At least one filter unit is positioned along the exhaust flow path. At least one electrostatic precipitator unit is positioned downstream of the filter unit along the exhaust flow path and through which exhaust gases are moved during exhaust operations. The electrostatic precipitator including an ionizing section upstream of a collecting section. The ionizing section includes a plurality of ionizing flow paths running between a plurality of ground plates, and a plurality of ionizing wires, wherein a side profile pattern of each ionizing flow path varies in width between at least one wide section and at least one narrow section, wherein the ionizing wires are located in wide sections and not in narrow sections. The collecting section includes a plurality of collecting flow paths running between a plurality of collecting plates, wherein a side profile pattern of each collecting flow path has a substantially uniform width and a repeating undulating side profile pattern.

In another aspect, a commercial cooking equipment exhaust hood system includes a hood structure including an inlet opening to an exhaust flow path through the hood. At least one filter unit is positioned along the exhaust flow path. A UV light source is located downstream of the at least one filter unit. A controller is operatively connected to control the UV light source via a dimmer, and the controller is configured to control the dimmer based upon at least one monitored exhaust condition.

The details of one or more embodiments are set forth in the accompanying drawings and the description below. Other features, objects, and advantages will be apparent from the description and drawings, and from the claims.

DETAILED DESCRIPTION

Figure 1:
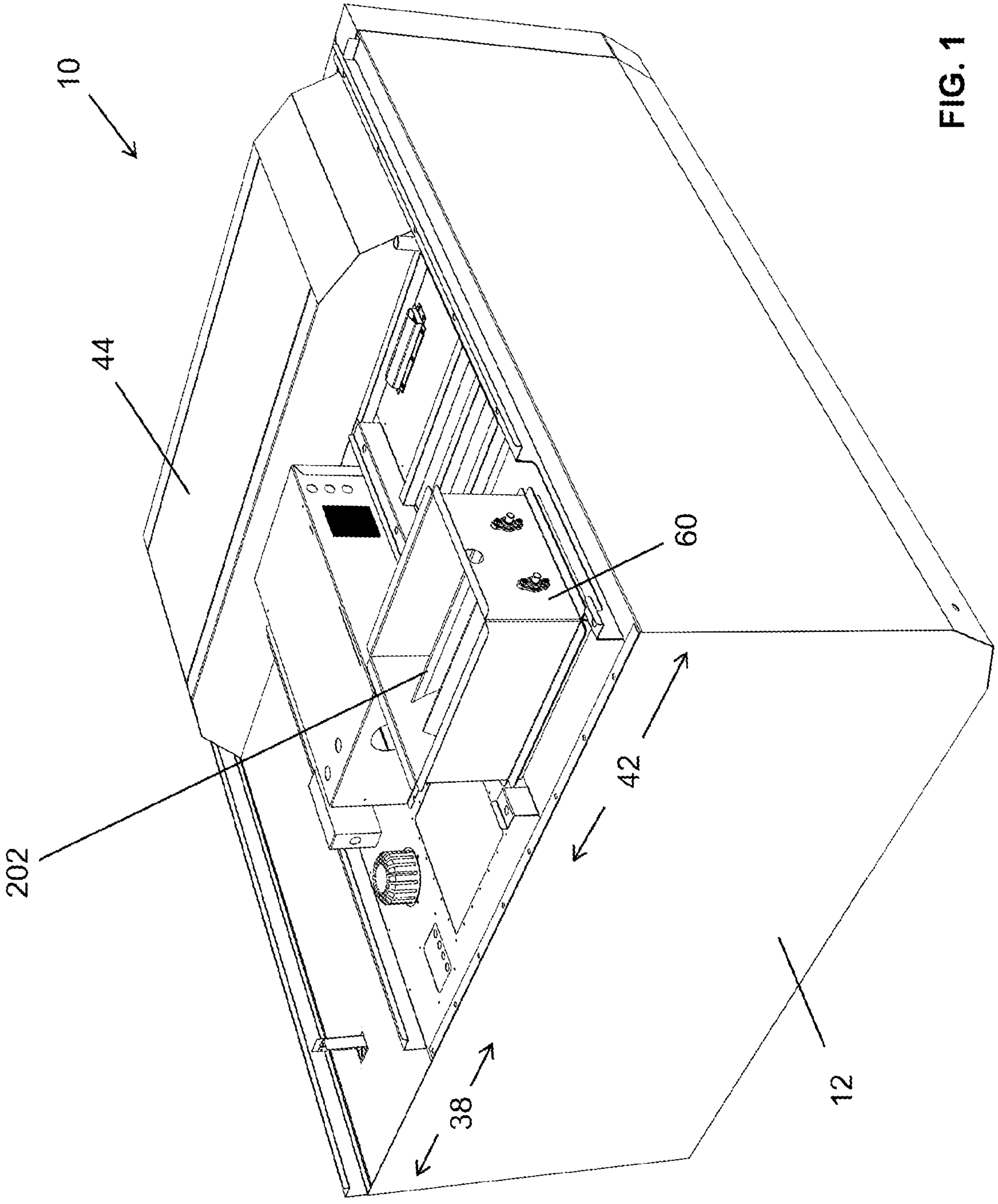
FIG. 1 a perspective view of an exemplary cooking exhaust hood system.
Figure 2:
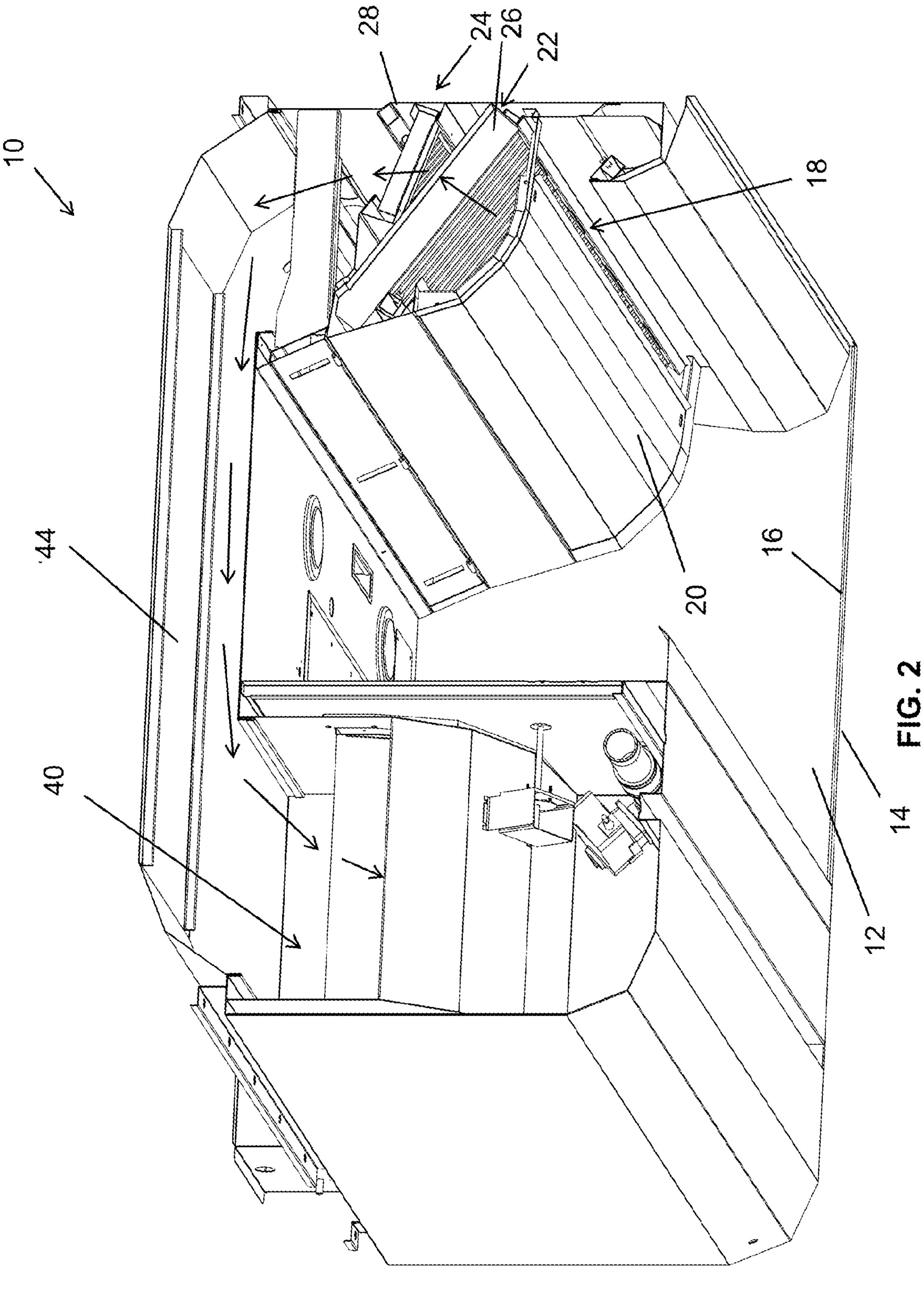
FIG. 2 is a perspective view of the hood system with one end cut away to expose hood internals.

Referring to FIGS. 1-4, a cooking exhaust system 10 is shown and includes a hood structure 12 having a lower edge 14 that defines a downwardly facing inlet opening 16. The hood structure 12 is located above a cooking area (not shown) having one or multiple cooking devices (not shown). By way of example, the cooking devices could be any of steam ovens, griddles, fryers, ranges etc. and any combination of different cooking devices.

An exhaust flow path through the hood passes through an slot opening 18 rearward of a baffle 20 and then through filter sections 22 and 24, where filter section 22 includes one or more primary filter units 26 and filter section 24 includes one or more secondary filter units 28. The filter units 26 and/or 28 may be removable for cleaning. Above filter unit(s) 28 a plenum 30 includes one or more UV light sources 32 (e.g., here with multiple UV lamp bulbs 34 extending directionally side to side along the hood structure). One or more treatment fluid injector(s) 36 is located proximate the UV light source and is controllable for injecting a treatment fluid. The treatment fluid may be an atomized spray of a solution that, in one example, includes surfactants and/or oxidizers and/or odorants. In one embodiment, the treatment solution includes Hexylene Glycol, one or more Alkylphenol branched alcohol alkoxylates and one or more fragrances and may or may not also include Hydrogen Peroxide. In another embodiment, Hydrogen Peroxide may be a primary constituent. In operation, the UV lamps emit UV light at 185 nanometers (nm) to generate ozone which interacts with the flow to break down grease particles and other odor causing particles in the exhaust flow, thereby reducing grease deposits on internal surfaces of the hood and reducing odors. The treatment solution enhances the effectiveness of the ozone and includes the odorant to further reduce any undesired smell of exhaust hood flows emitted downstream.

In the illustrated embodiment, the plenum 30 is located in a rear section 38 of the hood structure 12. Another flow area 40 is located in a forward section 42 of the hood structure 12, with a duct 44 running from the rear section 38 to the forward section in order to deliver exhaust gases from the plenum 30 and into the flow area 42. Here, the duct 44 is located toward one side of the hood structure 12. An electrostatic precipitator (ESP) 50 is located along the flow area 40. Upstream baffle structure(s) 52 direct flow into the inlet end 54 of the ESP 50 and downstream baffle structure(s) 56 direct flow from the outlet end 58 of the ESP 50 upward and into the exhaust outlet duct 60. Thus, a flow direction 62 through the ESP is generally laterally along the front section 42 of the hood structure 12. A fan 200 may be located downstream of outlet duct 60 for pulling air through the flow path of the hood structure 12, and a controllable damper 202 may be located in the outlet duct 60.

Figure 5:
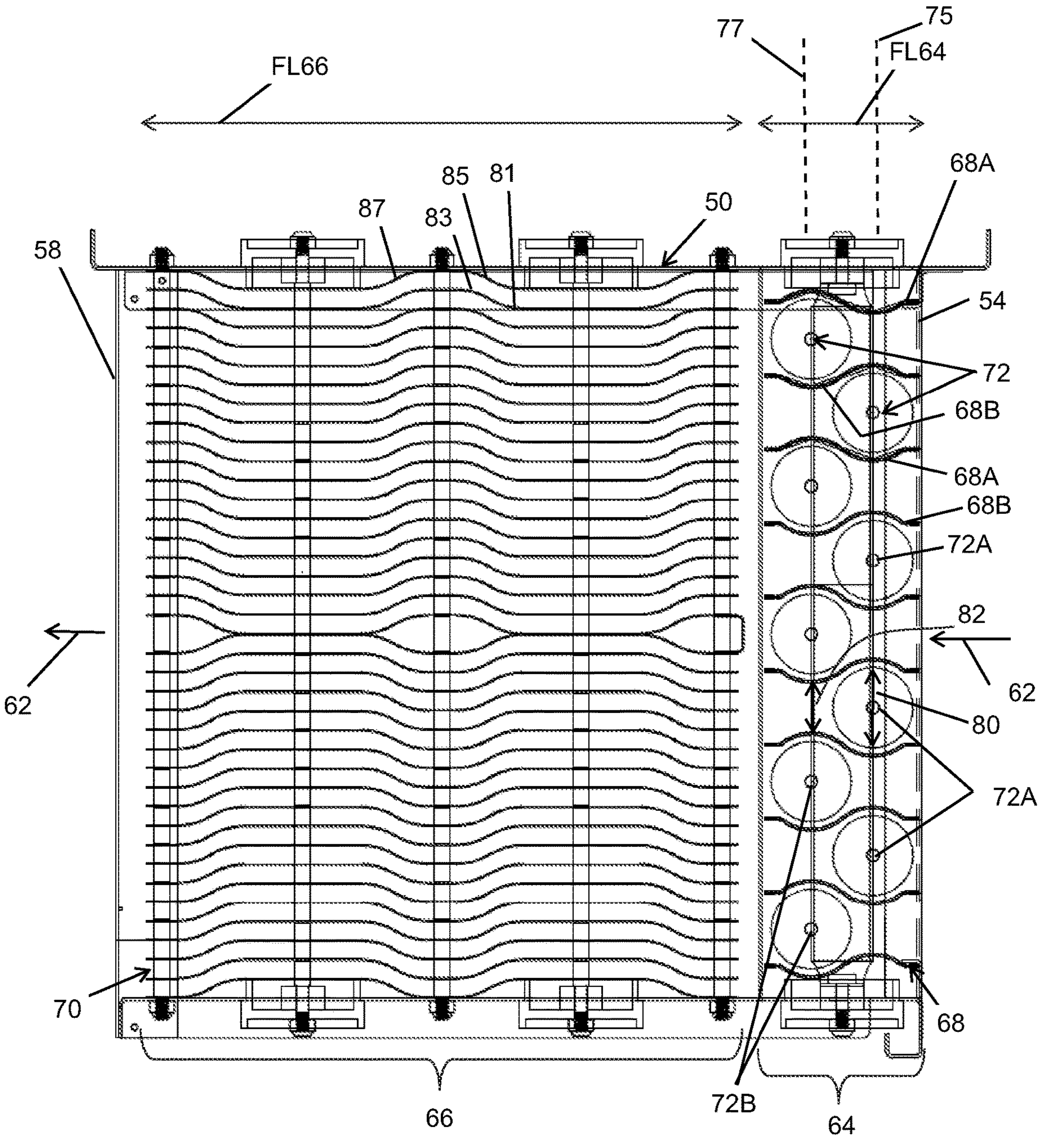
FIG. 5 is a schematic top plan view of an ESP utilized in the hood system.

Referring to the front side profile schematic view of the ESP shown in FIG. 5, the ESP 50 includes an ionizing section 64 upstream of a collecting section 66. Both sections are formed in part by respective sets of plates 68 and 70 that are bent, stamped or otherwise formed to have an undulating side profile pattern. Here the undulating side profile patterns are cyclic curves (e.g., sinusoidal in nature), but other undulating patterns are possible.

In the ionizing section 64 the plates 68 are ground plates (e.g., connected to electrical ground) and particles through the ionizing section are charged or ionized by the voltage field set up between ionizing wires 72 and the ground plates 68. By way of example, the ionizing wires may have an applied positive voltage of at least 10,000 Volts (e.g., 12,000 Volts or more, such as 15,000 Volts). The ground plates 68 define multiple ionizing flow paths through the ionizing section 62, and each ionizing wire 72 is positioned along one of the flow paths. The ground plates 68 include a common undulating side profile pattern, ground plates 68A and ground plates 68B arranged in an alternating side-by-side pattern such that each ionizing flow path is formed as a ionizing gap between one ground plate 68A and one ground plate 68B. The undulating side profile pattern of the ground plates 68B is offset, in the flow direction 62, from the side profile pattern of the ground plates 68B, such that a side profile pattern of each ionizing gap varies in width between at least one wide section 80 and at least one narrow section 82. Here, each ionizing gap includes one wide section and one narrow section, but variations are possible.

As shown, the ionizing wires 72 are located in wide sections 80, with no wires 72 in the narrow sections 82. The ionizing wires 72 include multiple ionizing wires 72A and multiple ionizing wires 72B, with the ionizing wires 72A lying in one common plane 75 perpendicular to the flow direction 62 and the ionizing wires 72B lying in another common plane 77 perpendicular to the flow direction. Here, the two common planes are parallel with each other and offset from each other in the flow direction 62. As seen, the side profile sequence of the ionizing wires 72 in a direction perpendicular to the flow direction 62 is an alternating sequence of wire 72A, wire 72B, wire 72A, wire 72A etc. The described configuration enables a relatively high density of ionizing wires with suitable charge capability set up in a smaller footprint.

In one example, a flow length dimension $FL_{64}$ of the ionizing section 64 in the flow direction 62 is less than 4 inches (e.g., less than 3.5 inches), and a spacing between each ionizing wire 72 and its adjacent ground plates 68A and 68B is maintained at at least 0.90 inches (e.g., about 1.0 inches), a spacing between ionizing wires in a direction perpendicular to the flow direction 62 in side profile is less than 1.60 inches (about 1.50 inches), and a charge of each ionizing wire is at least 8,000 V (e.g., about 10,000 V). However, variations are possible.

In the collecting section 66 the plates 70 are arranged as alternating charged (e.g., −7,500 Volts) and ground plates define multiple collecting flow paths through the collecting section. The collecting plates 70 include a common and repeating undulating side profile pattern, where the patterns aligned with each other in the flow direction 62. Here, the undulating pattern of the plates 70 includes substantially planar segments 81 and shorter planar segments 83 joined by curved segments 85 and 87, but other undulating variations are possible. Each collecting flow path is formed as a collecting gap between adjacent collecting plates, such that a side profile pattern of each collecting gap has a substantially uniform width and a repeating undulating side profile gap pattern. The undulating pattern of the collecting gap forces more ionized particles to contact and attach to the collecting plates than in the case of collecting gaps without any undulating pattern. In one example, a width of each collecting gap (here in the up and down direction) is no more than about 0.35 inches (e.g., no more than about 0.25 inches), and a flow length dimension FL66 of the collecting section 66 is between about 8 inches and about 16 inches (e.g., about 12 inches). However, variations are possible.

Figure 3:
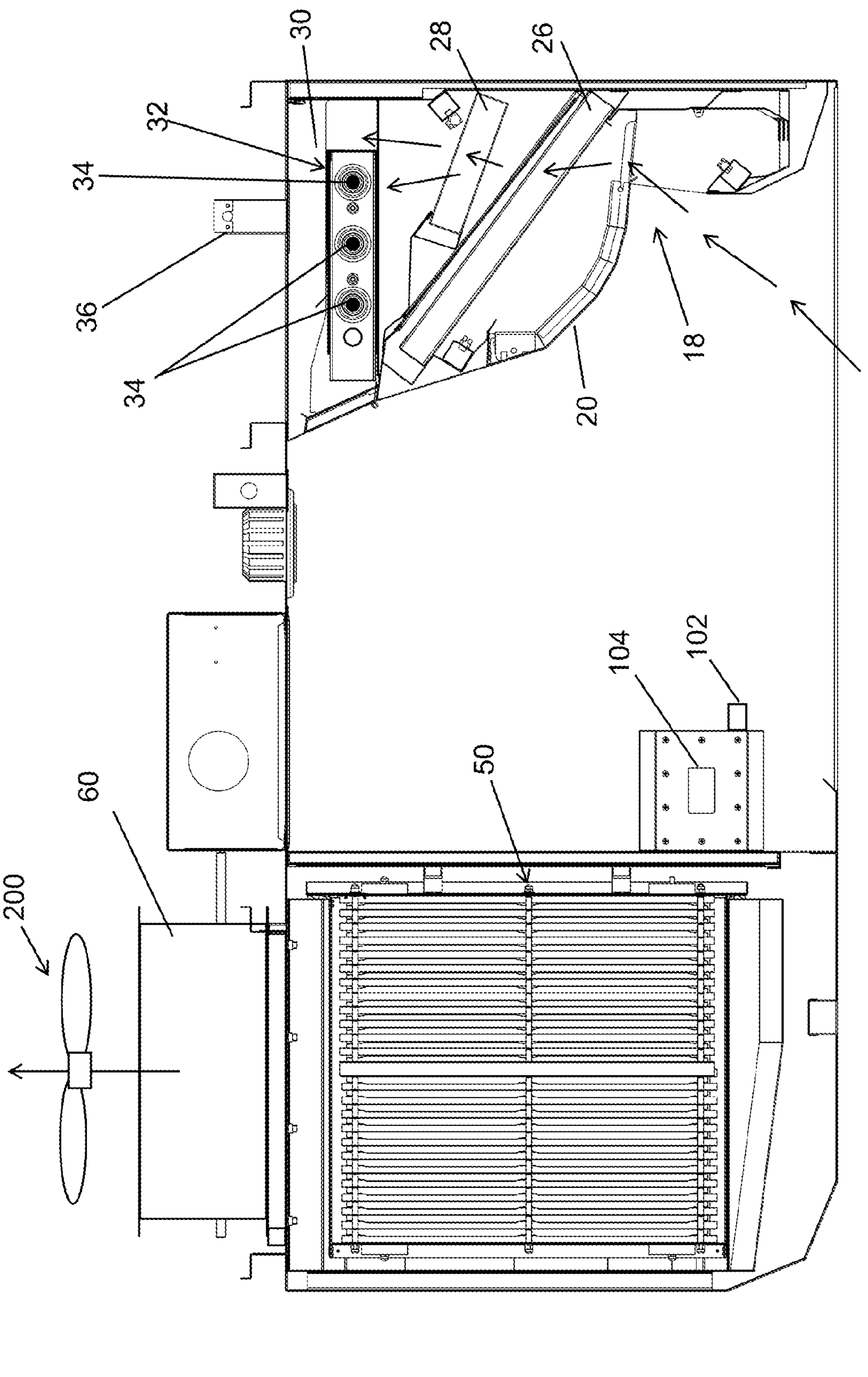
FIG. 3 is a cross-section view of the hood system.
Figure 4:
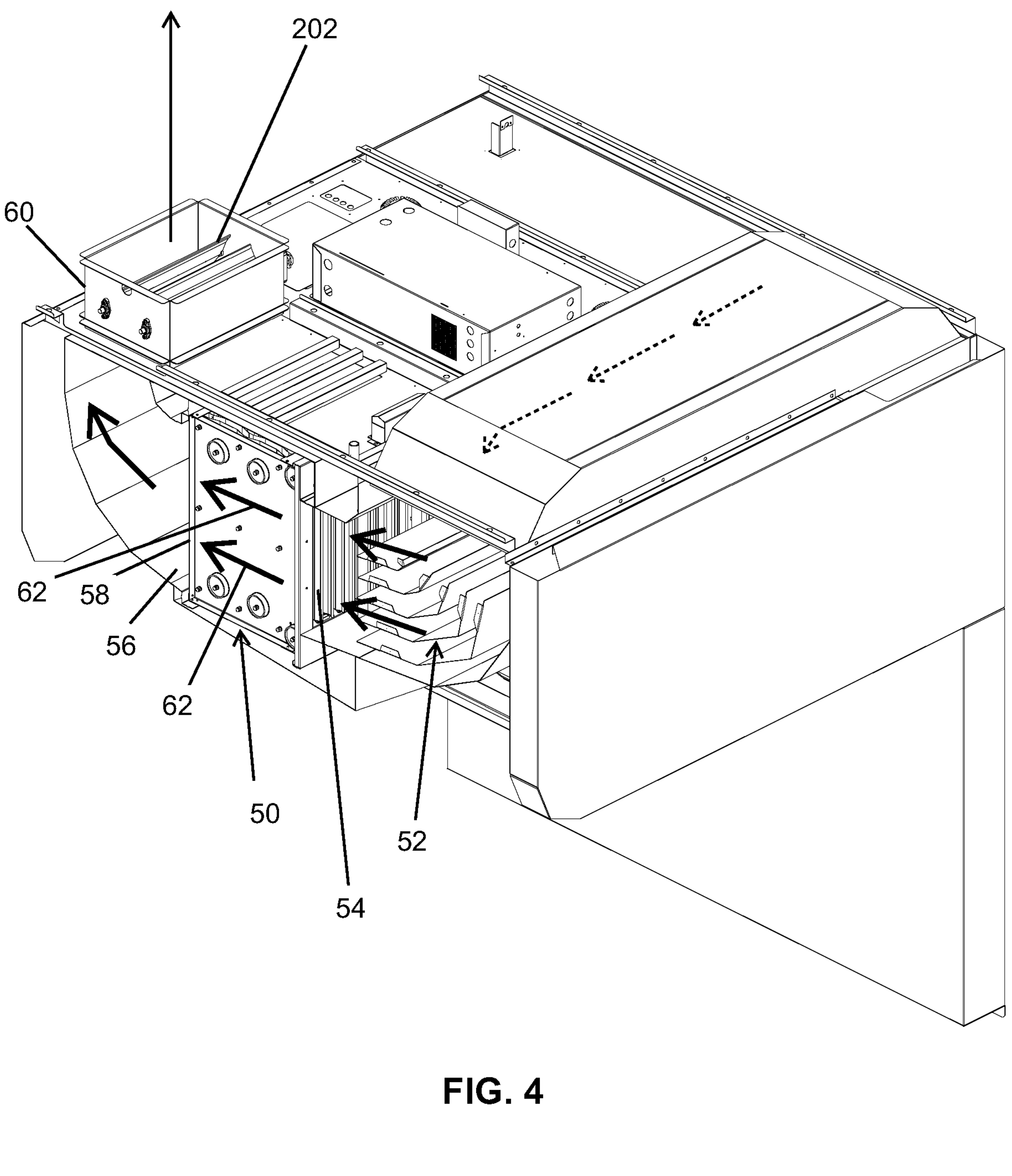
FIG. 4 is a perspective view showing internals of a front section of the hood system.
Figure 6:
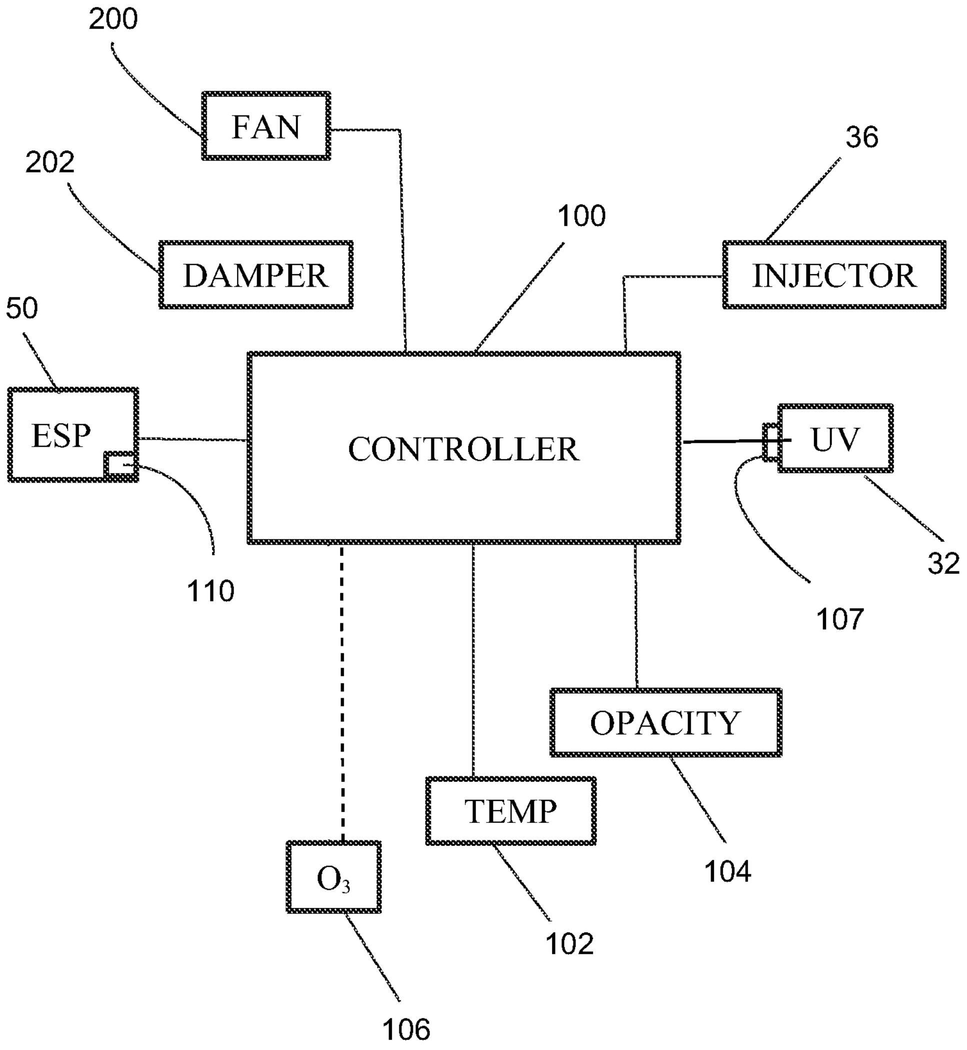
FIG. 6 is a schematic control arrangement of the hood system.

Referring again to the UV light source 32 and injector 36 seen in FIG. 3, and the control arrangement schematically depicted in FIG. 6, a controller 100 may be operatively connected to each of the fan 200, damper 202, ESP unit 50, UV source 32 and injector 36 for control of each. As used herein, the term controller is intended to broadly encompass any circuit (e.g., solid state, application specific integrated circuit (ASIC), an electronic circuit, a combinational logic circuit, a field programmable gate array (FPGA)), processor (s) (e.g., shared, dedicated, or group—including hardware or software that executes code), software, firmware and/or other components, or a combination of some or all of the above, that carries out the control functions of the hood or the control functions of any component thereof. Rather than operate the UV light source 32 under assumed full load during vent operations, the controller 100 is configured to modulate power to the UV light source 32 and modulate amount of treatment fluid injected by injector 36 based upon at least one monitored exhaust condition. The controller may effect such power modulation via a dimmer 107 associated with the UV light source (e.g., where the dimmer enables selective and variable chopping of the applied voltage waveform to the light source).

In this regard, and referring to FIG. 6, one or more temperature sensors 102 may be provided within the hood structure 12 and one or more opacity sensors 104 may be provided within the hood structure. In such cases, the at least one monitored exhaust condition may be a temperature as indicated by the temperature sensor 102 and/or an opacity level as indicated by the opacity sensor 104. The controller 100 increases power to the UV light source and increases amount of treatment fluid injected by injector 36 in response to one or both of higher temperatures or higher opacity levels, which generally occurs during conditions requiring more odor removal and treatment.

In one implementation of such a system, various temperatures and opacity levels represent different cooking loads that need be exhausted and treated (with higher temperatures and higher opacity levels corresponding to higher cooking loads that result in both higher odor in the exhaust and a demand for more flow through the hood). Based upon all load demand inputs (e.g., temperature sensor(s), opacity level sensor(s) and potentially other demand indicators) the controller may be configured to select and effect necessary UV production and treatment solution spray amounts based upon the highest load demand indicator/condition. As noted above, as load demand increases, and flows through the hood increase, the UV light generation increases and the amount of sprayed treatment fluid increases. The UV control may be effected by automated control of a dimming switch 108 (e.g., a switch that chops the input voltage signal to the UV lamps, with less chopping occurring to produce higher UV output levels). The treatment solution spray control may be varied by adjusting a dwell or delay time between input sprays (e.g., each chemical spray is for a set duration, such as 3-7 seconds (e.g., about 5 seconds) and the variation is achieved by changing the dwell or time spacing between such sprays). In other words, the higher the cooking load demand on the hood, the shorter the dwell between sprays (e.g., 55-65 second dwell during low demand hood operation, 10-20 second dwell during medium demand hood operation, and 3-8 second dwell during high demand hood operation), resulting in a higher average spray amount over time. The number of dwell variations could, however, be greater than the three mentioned above (e.g., 4 or more, 5 or more, or even 10 or more different dwell times according to 10 or more different flow demand levels etc.).

Thus, the controller adjustment of UV light output, along with controlled adjustment of treatment solution introduced into the exhaust flow in vicinity of the UV light, enables the system to match the demand for treatment during both high demand/high flows and low demand/low flows, as well as intermediate demands/flows, without producing an overabundance of ozone that will end up being exhausted from the hood system as an undesired greenhouse gas. That is, the controlled system makes it more likely that a substantial majority of the produced ozone will be consumed by the treatment activity in the hood under substantially all flow conditions.

Of course, other monitored exhaust conditions could also be used for control of the UV source 32 and injector 36, such as an ozone sensor 106, in which case the controller 100 increases power to the UV light and increases the amount of treatment fluid injected in order to assure a minimum ozone level that is sufficient to treat whatever load demand and flow is passing through the hood.

In terms of control of the ESP 50, the control arrangement may include a short-circuit sensor 110 (e.g., a current sensor) to detect short circuiting of the ESP 50. If a series of repeated short circuits are detected, the controller 100 shuts down the ESP 50 and then powers it back up at a lower voltage that is less likely to short. This short sensing and voltage reduction of the ESP can repeated until the short is eliminated. By way of example, if the normal operating level of the ESP is 15,000 volts and short is detected, the controller 100 shuts down the ESP 50, and restarts the ESP at 13,500 volts. If no short is detected at 13,500 volts, the ESP continues to be operated at that lower voltage. On the other hand, if a short is also detected at 13,500 Volts, either immediately upon the restart or at a later time, the controller 100 shuts down the ESP and restarts it at 12,000 Volts. An additional stage of voltage reduction could be 10,500 Volts. Because the causes of shortage (e.g., moisture) can dissipate over time, the reduced voltage can be maintained for some specified time period, after which the controller 100 shuts down the ESP 50 and attempts to restart ESP 50 at a higher voltage. The controller 100 could, for example, immediately jump the ESP back up to the highest voltage and then stage back down as needed if short conditions still exist.

Figure 7:
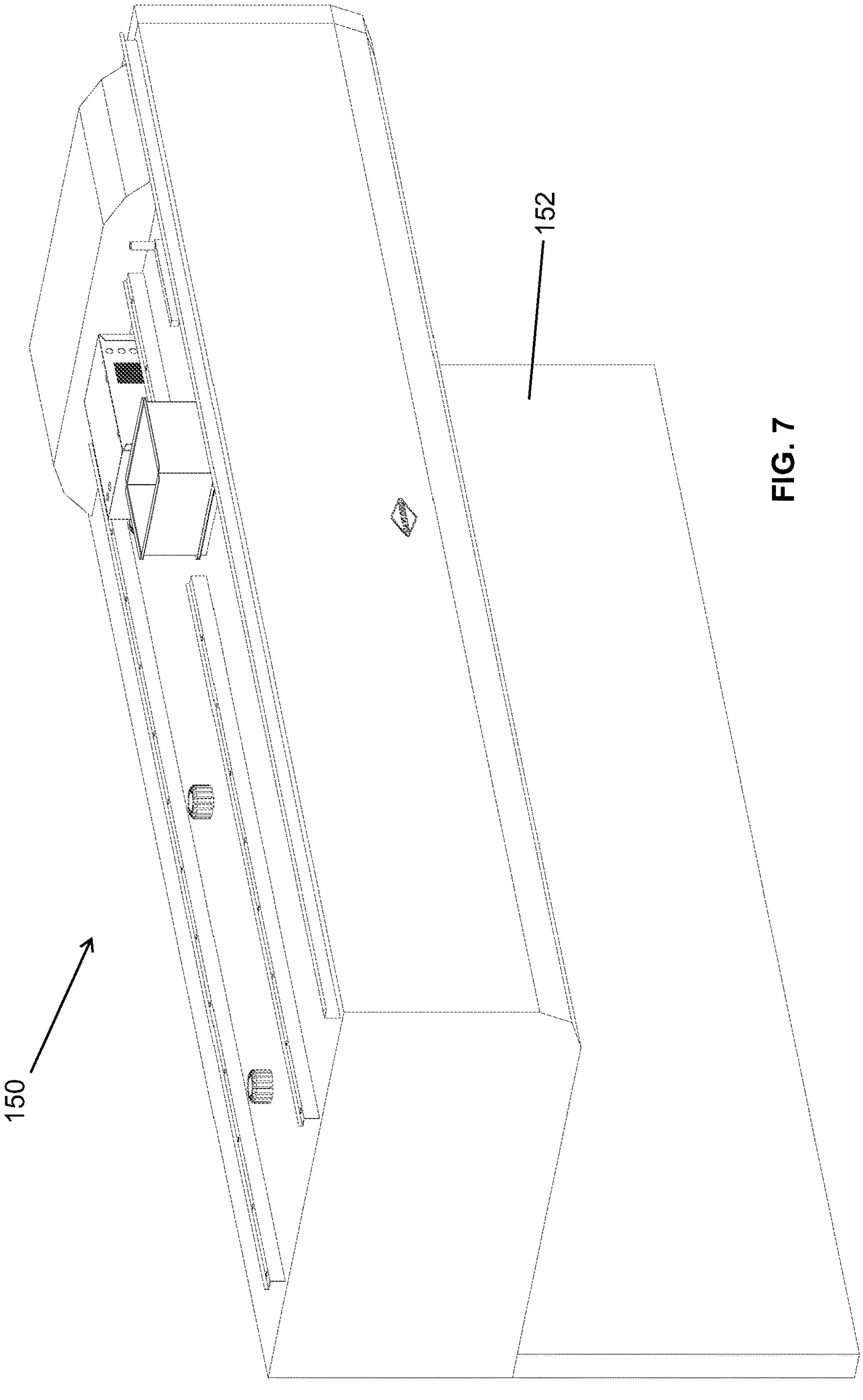
FIG. 7 is another embodiment of a hood system.
Figure 8:
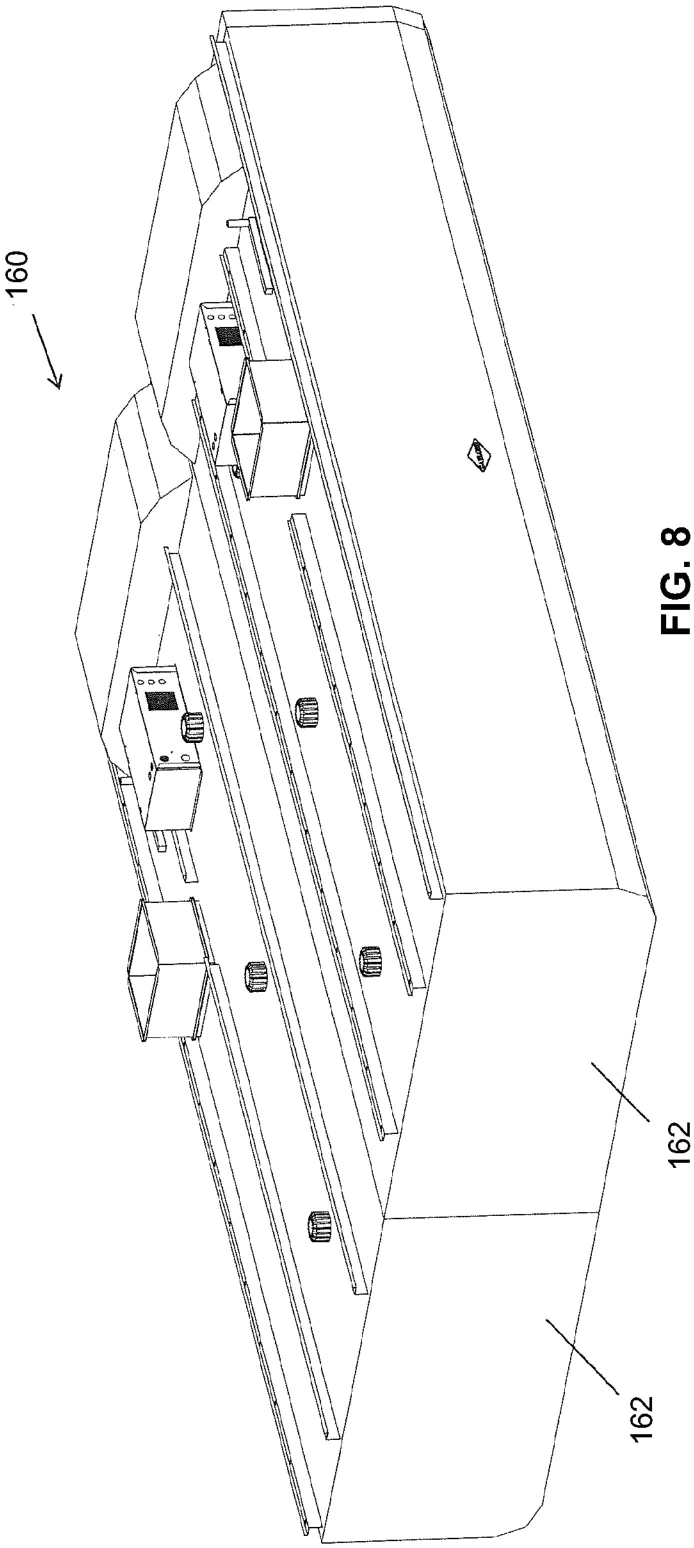
FIG. 8 is another embodiment of a hood system.

Referring to FIG. 7, in some implementations the hood system 150 may include an associated rear wall structure 152 that is used for feeding air up into the hood structure as described in U.S. Pat. No. 8,939,142. FIG. 8 shows a system 160 with a pair of hood structures 162 arrange back to back, as may typically used in inner regions of a kitchen space wherein cooking equipment is not adjacent any wall.

It is to be clearly understood that the above description is intended by way of illustration and example only, is not intended to be taken by way of limitation, and that other changes and modifications are possible.

What is claimed is:

1. A commercial cooking equipment exhaust hood system, comprising:

a hood structure including a front side, a rear side, and first and second lateral sides running from the front side to the rear side, wherein the hood structure includes a rear section toward the rear side and a front section toward the front side, wherein an inlet opening to the hood structure is located in the rear section;

at least one filter unit positioned in the rear section of the hood structure such that exhaust gases moving up into the inlet opening pass through the at least one filter unit;

wherein the rear section of the hood structure includes a plenum above the at least one filter unit for receiving exhaust gases that pass through the at least one filter unit;

at least one filtration device located in the front section of the hood structure;

an exhaust gas flow path from the plenum to the front section of the hood structure;

wherein exhaust gases from the plenum move in a forward direction along the exhaust gas flow path into the front section of the hood structure and then through the at least one filtration device and then to an outlet of the hood structure;

wherein exhaust gases move in a lateral direction as the exhaust gases move along the front section of the hood structure through the at least one filtration device, wherein the lateral direction extends from the first lateral side toward the second lateral side.

2. The commercial cooking equipment exhaust system of claim 1, wherein the at least one filtration device comprises an electrostatic precipitator.

3. A commercial cooking equipment exhaust system, comprising:

at least one filter unit positioned along an exhaust flow path;

a UV light source downstream of the at least one filter unit;

a controller operatively connected to control a power level of the UV light source, the controller configured to control the power level based upon at least one monitored exhaust condition;

wherein the controller is configured to (a) increase the power level of the UV light source in response to an increase in the monitored exhaust condition and (b) decrease the power level of the UV light source in response to a decrease in the monitored exhaust condition.

4. The commercial cooking equipment exhaust system of claim 3, wherein the monitored exhaust condition is one of opacity or temperature.

5. A commercial cooking equipment exhaust hood system, comprising:

a hood structure including a front side, a rear side, and first and second lateral sides running from the front side to the rear side, wherein the hood structure includes a rear section toward the rear side and a front section toward the front side, wherein an inlet opening to the hood structure is located in the rear section;

at least one filter unit positioned in the rear section of the hood structure such that exhaust gases moving up into the inlet opening pass through the at least one filter unit;

wherein the rear section of the hood structure includes a plenum above the at least one filter unit for receiving exhaust gases that pass through the at least one filter unit;

at least one filtration device located in the front section of the hood structure;

a duct structure extending in a forward direction from the rear section to the front section, the duct structure located toward the first lateral side of the hood structure;

wherein exhaust gases from the plenum move in the forward direction along the duct structure into the front section of the hood structure and then in a lateral direction through the at least one filtration device, wherein the lateral direction extends from the first lateral side toward the second lateral side.

6. The commercial cooking equipment exhaust system of claim 5, further comprising:

a baffle structure in the front section of the hood structure upstream of the at least one filtration device and configured to direct exhaust gases from the duct structure in the lateral direction.

7. The commercial cooking equipment system of claim 6, wherein exhaust gases from the duct structure move downwardly into the baffle structure and the baffle structure includes multiple baffle plates that direct the exhaust gases in the lateral direction.

8. The commercial cooking equipment exhaust system of claim 5, wherein the at least one filtration device comprises an electrostatic precipitator.

9. The commercial cooking equipment exhaust system of claim 1, further comprising:

a baffle structure in the front section of the hood structure upstream of the at least one filtration device and configured to direct exhaust gases in the lateral direction.

10. The commercial cooking equipment system of claim 9, wherein exhaust gases move downwardly into the baffle structure and the baffle structure includes multiple baffle plates that direct the exhaust gases in the lateral direction.

* * * * *